(12) United States Patent
Orborn

(10) Patent No.: US 6,790,348 B2
(45) Date of Patent: Sep. 14, 2004

(54) EXTERNAL LUBRICANT FILTER SYSTEM FOR AUTOMATIC TRANSMISSIONS

(76) Inventor: Walter A. Orborn, 1390 W. Hwy. 26, Blackfoot, ID (US) 83221

(*) Notice: Subject to any disclaimer, the term of this patent is extended or adjusted under 35 U.S.C. 154(b) by 13 days.

(21) Appl. No.: 10/079,715

(22) Filed: Feb. 19, 2002

(65) Prior Publication Data

US 2003/0155287 A1 Aug. 21, 2003

(51) Int. Cl.⁷ .............................. B01D 35/027
(52) U.S. Cl. .................. 210/172; 210/168; 210/171; 210/416.5; 210/443; 210/DIG. 17
(58) Field of Search ................. 210/167, 168, 210/171, 172, 249, 416.5, DIG. 17, 443; 184/6.24, 106, 6.28, 36; 475/159, 160

(56) References Cited

U.S. PATENT DOCUMENTS

| | | | |
|---|---|---|---|
| 3,707,202 A | * 12/1972 | Dixon | 184/6.24 |
| 3,784,011 A | 1/1974 | Ward | 210/168 |
| 4,276,859 A | * 7/1981 | Streicher et al. | 123/196 R |
| 4,689,144 A | 8/1987 | Holmes | 210/130 |
| 5,546,999 A | 8/1996 | Parker | 141/98 |

* cited by examiner

Primary Examiner—Matthew O. Savage

(74) Attorney, Agent, or Firm—Pedersen & Co., PLLC; Ken J. Pedersen; Barbara S. Pedersen

(57) ABSTRACT

This invention provides an external lubricant filter system for automatic transmissions comprising a modified transmission lubricant pan assembly and an external spin on/off lubricant filter canister that is removably and sealably connected to the modified pan. The transmission pan is modified to include a filter adapter, a pick-up assembly, a discharge tube and inlet and outlet chambers. The filter adapter includes an externally threaded pipe nipple for removably receiving the filter canister, lubricant entry port and a lubricant inlet plenum for distributing the potentially contaminated lubricant to the inlet orifices of the filter canister, and a filter sealing surface. The lubricant pick up assembly delivers contaminated lubricant from the pan to the filter canister via the inlet chamber, and the entry port and plenum of the filter adapter. The discharge tube receives cleansed oil from the filter canister via the nipple and outlet chamber and delivers it to the inlet of the transmission's lubricant pump. In the preferred embodiment of this invention the filter canister is a conventional spin on/off oil filter. The modified pan may be formed by altering a factory stock pan, or preferably by altering an aftermarket product. Alternatively, the pan may be manufactured as an original equipment item that incorporates the novel features of this invention.

3 Claims, 4 Drawing Sheets

EXTERNAL LUBRICANT FILTER SYSTEM FOR AUTOMATIC TRANSMISSIONS

BACKGROUND OF THE INVENTION

1. Field of the Invention

This invention relates to fluid filters and more specifically to lubricant filters used for automatic transmissions such as those used in conjunction with internal combustion engines.

2. Related Art

It is well established that the life of mechanical equipment is dependent on the quality of the lubricating fluid, i.e. the lubricant. The quality of lubricant, and in the case of automatic transmissions, the power transfer fluid, is assured by periodic lubricant replacement and thorough and continuous filtering of undesired foreign matter from the fluid.

The conventional approach for filtering the power transfer and lubrication fluid used in automatic transmissions is to include the entire filter system within the transmission housing. As a result, changing or cleaning a filter requires removing and replacing the lower portion of the housing, i.e. the pan (or sump). This is a very time consuming process that is most frequently performed by professional automotive transmission specialists. In addition, because of the difficulty and expense of changing these conventional filter systems, vehicle operators frequently delay filter changes well beyond recommended mileage intervals, or even worse, they avoid changing the filters altogether. This can lead to premature failure of the transmission thus incurring repair or replacement costs of several hundred or even thousands of dollars. Furthermore, by removing the pan, the risk of creating undesired transmission fluid leaks through a damaged pan gasket is substantially increased. Of course the occurrence of such leaks is typically unknown until the transmission is operated sufficiently to achieve normal operational temperatures. Thus these leaks may go undetected for a long time. When the leak is finally detected, the pan must be removed a second time, losing substantial quantities of the fresh fluid lubricant, and a new gasket must be installed. This process is time consuming, wasteful, environmentally damaging, and costly.

Prior inventors are not known to have addressed this problem. Parker (U.S. Pat. No. 5,546,999) discloses new equipment for replenishing the lubricant of an automatic transmission. Parker connects his apparatus to an existing external fluid filter included in the transmission cooling line of a tractor. He does not address the issue of a convenient method of replacing automatic transmission fluid filters.

Ward (U.S. Pat. No. 3,784,011) provides improved filtering of automatic transmission fluid by incorporating a magnetic medium in a supplemental filter included within the automatic transmission housing.

Holmes (U.S. Pat. No. 4,689,144) discloses a new supplemental filter for automatic transmissions that incorporates both mechanical and magnetic filtering elements in a disposable filter. The filter is provided with fluid entry and exit spigots at opposite ends of a cylindrical casing. This external filter is preferably placed in the cooling supply line before the transmission-cooling radiator. Holmes' filter is a new, unconventional design and thus not easily available commercially at this time. Furthermore, Holmes' filter is not integral with the transmission housing and thus requires potentially unreliable connection points and fluid transmission hoses. And finally, Holmes' filter is not easily replaced since it is of an unconventional design and is not adapted for a spin-on/spin-off installation and removal.

Thus, the objects of the extant invention are:

a. to provide a transmission lubricant filter that does not require removal of the transmission sump pan for its replacement, b. to provide an transmission lubricant filter of the conventional spin-on/spin-off design that is external to the transmission, c. to provide a transmission filter that is conveniently replaced, d. to provide a transmission fluid/lubricant filter that filters all of the transmission lubricant that circulates through the lubricant pump, e. to provide a more efficient transmission lubricant filter, f. to provide a transmission filter that is easily adapted to any automatic transmission, g. to provide a filtering concept that may be inexpensively incorporated into new transmission designs, h. to provide a transmission filter that minimizes the loss of lubricant in the filter replacement process, and i. to provide an automatic transmission filter that eliminates the leakage of fluid through the transmission sump pan gasket that may result from gasket damage during filter replacement.

SUMMARY OF THE INVENTION

As summarized in the previous discussion, there is a long felt and unfulfilled need for a means to conveniently, safely and effectively replace automatic transmission lubricant filters. To meet this need, the preferred embodiment of the extant invention provides an external lubricant filter system for automatic transmissions comprising a modified transmission lubricant pan assembly and an external spin on/off lubricant filter canister that is removably connected to the modified pan.

The transmission pan is modified to include a filter adapter in the wall of the pan. The filter adapter includes an externally threaded pipe nipple and sealing surface for removably and sealably receiving the filter canister. The adapter also includes a lubricant entry port and a lubricant inlet plenum for distributing the potentially contaminated lubricant to the inlet orifices of the filter canister.

The pan is further modified to incorporate a lubricant inlet chamber and a lubricant outlet chamber, both secured to the interior wall of the pan. This invention further includes a lubricant pick up assembly and a lubricant discharge tube. The lubricant pick up assembly delivers contaminated lubricant from the pan to the filter canister via the inlet chamber, and the entry port and plenum of the filter adapter. The discharge tube receives cleansed oil from the filter canister via the nipple and outlet chamber and delivers it to the inlet of the transmission's lubricant pump.

In the preferred embodiment of this invention the filter canister is a conventional spin on/off oil filter. The modified pan may be formed by altering a factory stock pan, or preferably by altering an aftermarket product. Alternatively, the pan may be manufactured as an original equipment item that incorporates the novel features of this invention In use, this invention revolutionizes the changing of automatic transmission fluid filters. Rather than having to remove the pan from the transmission, the filter canister is merely rotated counterclockwise to remove it from the pan while the pan remains attached to the transmission housing. The replacement filter is simply threaded clockwise onto the cooperating pipe nipple and sealed to the adapter via the seal supplied with the filter. In this fashion, the objectives of this invention are fully satisfied. The filter canister may be changed without removing the pan of the transmission, commercial off-the-shelf filters are used, all of the lubricant passing through the pump is filtered and loss of fluid during filter changing operations is minimized. Additionally, this invention may be retrofitted to existing automatic transmissions, or it may be incorporated in the original manufacture of the transmission.

These and many other features and attendant advantages of the invention will become apparent, as the invention becomes better understood by reference to the following detailed descriptions and accompanying drawings.

DESCRIPTION OF THE PREFERRED EMBODIMENTS

Figure 1:
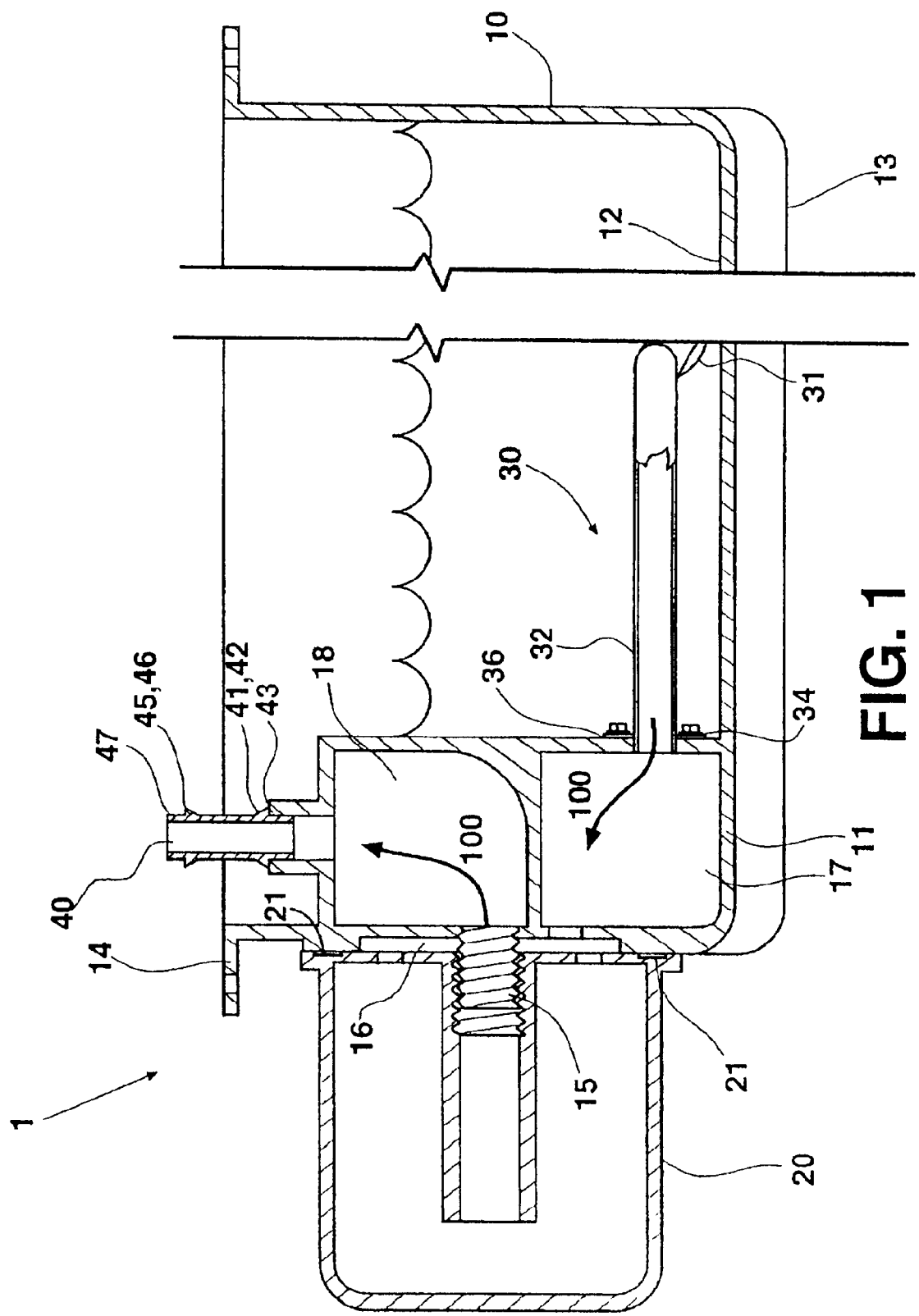
FIG. 1 is a left side view of the preferred embodiment of this invention showing all of the major features of this invention.
Figure 2:
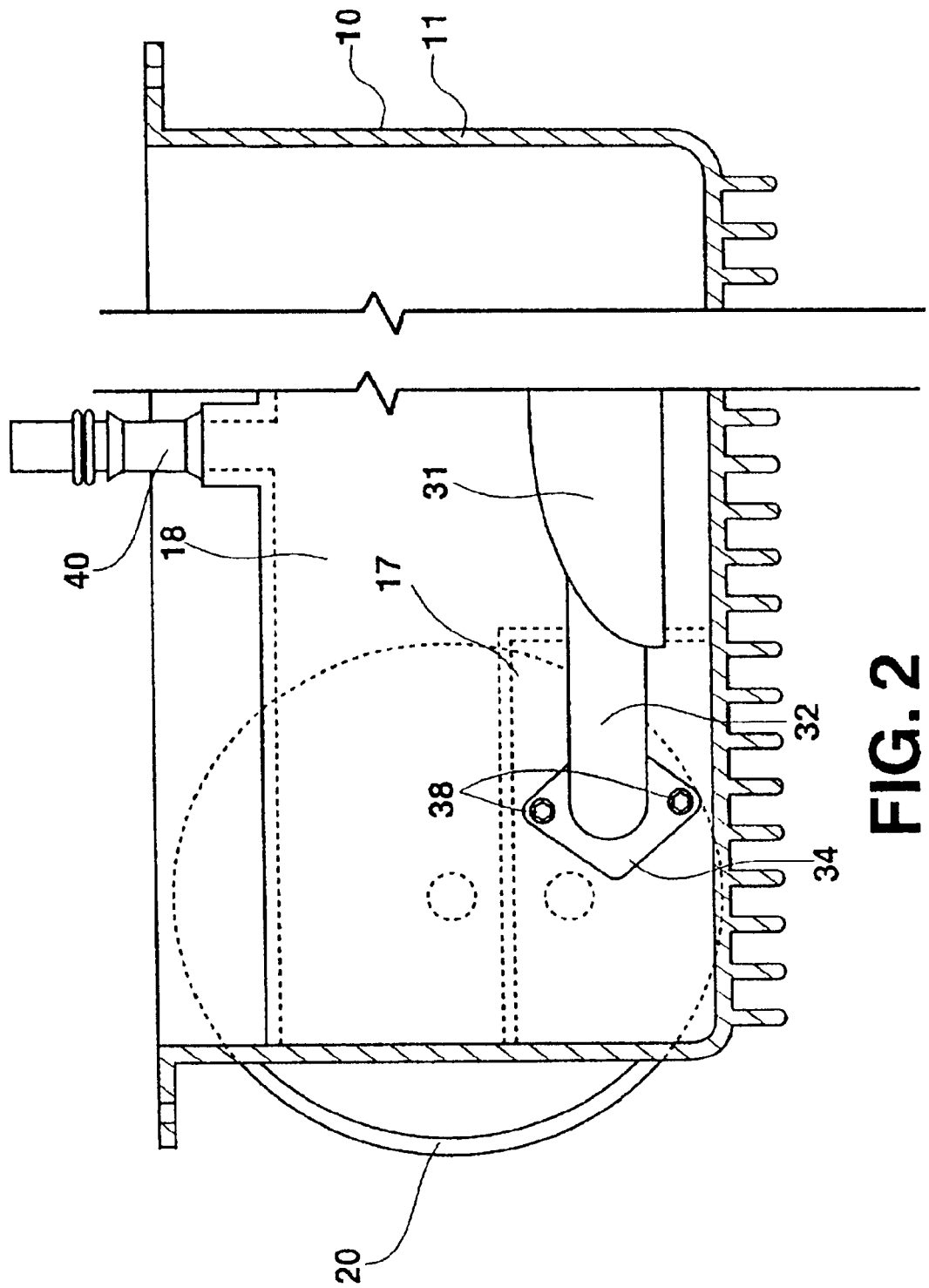
FIG. 2 is a forward view of this invention.
Figure 3:
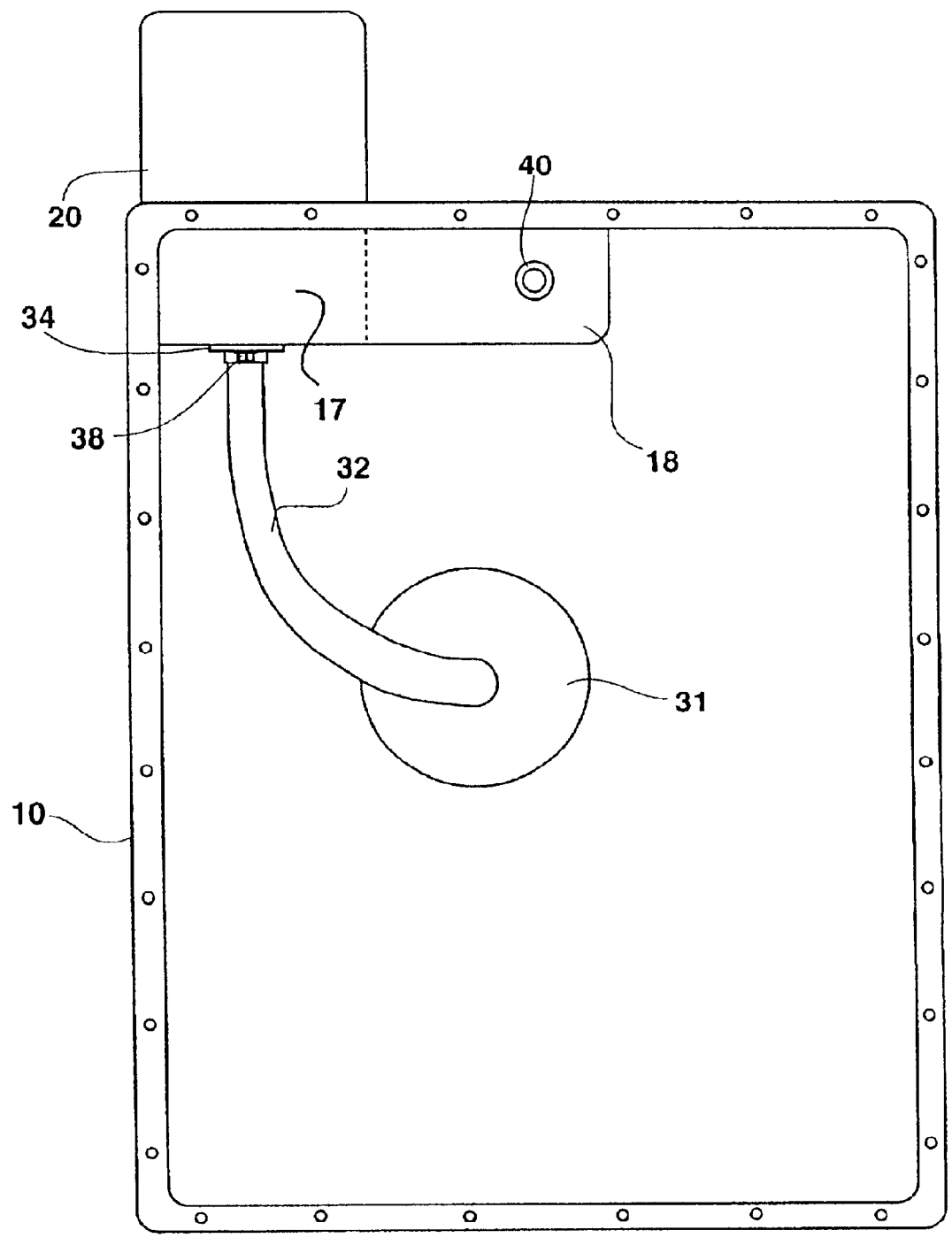
FIG. 3 is a top view of this invention.
Figure 4A:
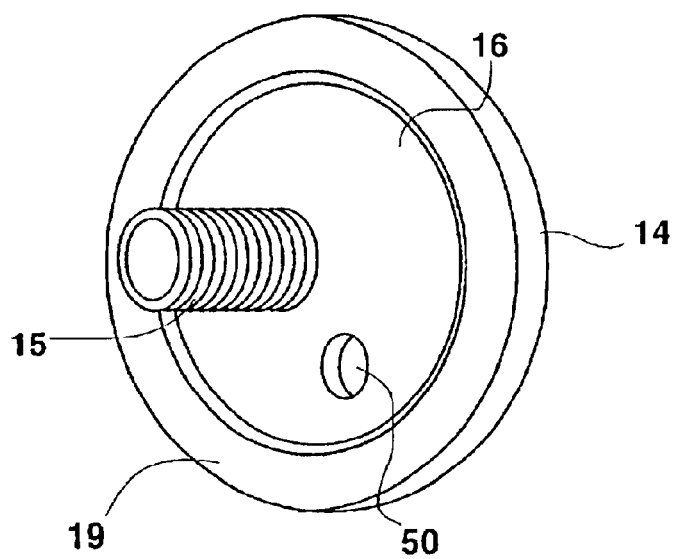
FIGS. 4A and 4B are two isometric views of the filter adapter, FIG. 4A being viewed from the outside, and FIG. 4B being viewed from the inside.
Figure 4B:
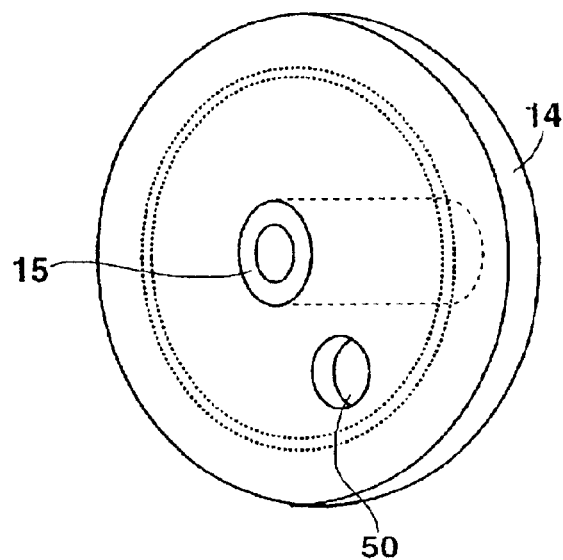

FIGS. 1, 2 and 3 show the salient and novel features of this invention of an external lubricant filter system 1 for automatic transmissions having a lubricant pump. The preferred embodiment of this invention comprises a modified transmission lubricant pan assembly 10 and an external spin on/off lubricant filter canister 20. The filter canister is removably and sealably connected to the modified pan. Pan assembly 10 includes wall 11 having internal and external surfaces 12, 13. The pan assembly also includes filter adapter 14 fixedly secured within the pan's wall between the internal and external surfaces. Referring now to FIGS. 4A and 4B adapter 14 further includes externally threaded pipe nipple 15, plenum 16, filter sealing surface 19 and lubricant entry port 50. Filter canister 20 is sealed to the pan with its integral seal 21 bearing against seal surface 19 on adapter 14. Pan assembly 10 farther includes inlet chamber 17 and outlet chamber 18, both fixedly attached to the internal surface of the wall of the pan.

Continuing reference to FIGS. 1,2 and 3, the pan assembly further includes lubricant pick up assembly 30 and lubricant discharge tube 40. Pick up assembly 30 includes cup portion 31, pick up tube 32, and flange portion 34. The flange portion is fixedly, sealingly and cooperatively connected to inlet chamber 17 via bolts 38 and sealed with flange gasket 36.

Discharge tube 40 includes lower and upper ends 41, 45. The lower end is fixedly, sealingly and cooperatively attached to outlet chamber 18 and the upper end is fixedly, sealingly and cooperatively attached to the inlet of the transmission lubricant pump which is common to all automatic transmissions (this pump is not shown in the figures). Lower and upper ends 41, 45 of the discharge tube have integral shoulders 42 and 46 respectively. Lower shoulder 42 urges lower discharge tube seal 43 against outlet chamber 18 to assure a leak free seal. Upper shoulder 46 similarly urges upper discharge tube seal 47 against the inlet port of the transmission's lubricant pump, also assuring a leak free seal.

In operation, and continuing reference to FIGS. 1, 2 and 3, lubricating fluid 100 is withdrawn from the transmission pan/sump 10 by the transmission lubrication pump via discharge tube 40. By this action of the pump, potentially contaminated lubricant is brought to filter canister 20 via pick-up assembly 30, inlet chamber 17, adapter lubricant entry port 50, and adapter plenum 16. Cleansed oil leaves the filter canister through pipe nipple 15 via outlet chamber 18 and is then delivered to the inlet of the pump by discharge tube 40.

In the preferred embodiment of this invention the filter is a conventional spin on/off oil filter such as are commercially available from Hastings™, Purolator™, Fram™ and the like. The modified pan may be formed by altering a stock factory pan, or preferably by altering an aftermarket product, such as a cast aluminum pan manufactured by TCI Automotive, 151 Industrial Drive, Ashland, MS, 38603. This pan provides the added benefits of having cooling fins. Alternatively, the pan may be manufactured as an original equipment item that incorporates the novel features of this invention.

The required alterations to the conventional pan include the following:

a. Forming filter adapter 14 from aluminum stock. This adapter is machined to provide a sealing surface for a standard commercial oil filter and its integral gasket, to accept externally threaded pipe nipple 15 and to provide plenum 16. Nipple 15 is formed by boring a ½ inch hole along the axis of a ¾ inch diameter, externally threaded, steel rod.

b. Cutting a hole in the wall of the pan and welding the filter adapter into the opening thus provided so that it becomes integral with the wall of the pan.

c. Forming the inlet and outlet chambers from aluminum sheet stock of about ¼ inch thickness by welding to the internal surface 12 of the pan's wall 11. These chambers are drilled to accept pick-up assembly 30 and discharge tube 40.

d. Forming pick-up assembly as shown in FIGS. 1, 2 and 3 from steel tubing and sheet stock to form flange 34 portion and cup portion 31. In the preferred embodiment, the pick-up assembly is formed by adding a short length of steel tubing with a flange to a stock oil pump pick-up tube. Two bolts 38 are used to attach the flange to the inlet chamber. This joint is sealed by flange gasket 36.

e. Forming discharge tube 40, having lower and upper shoulders 42, 46, from aluminum stock. Lower end 41 of the discharge tube is connected to outlet chamber 18 via lower seal 43. This seal is urged into the outlet chamber by lower shoulder 42. In a similar fashion, the upper end of the discharge tube is sealed to the inlet of the transmission lubricant pump by urging upper shoulder 46 against upper seal 47 which in turn sealingly presses into the inlet of the pump. Both seals are conventional as used to seal internal transmission filters.

In use, this invention revolutionizes the changing of automatic transmission fluid filters. Rather than having to remove the pan from the transmission, the filter canister is merely rotated counterclockwise to remove it from the pan while the pan is still attached to the transmission housing. The replacement filter is then simply clockwise threaded onto cooperating nipple 15 and sealed to adapter 14 via the seal supplied with the filter canister.

In this fashion, the objectives of this invention are fully satisfied. The filter may be changed without removing the pan from the transmission housing, commercial off-the-shelf filters may be used, all of the lubricant passing through the pump is filtered and loss of fluid during filter changing operations is minimized. Additionally, this invention may be retrofitted to existing automatic transmissions, or it may be incorporated in the original manufacture of the transmission.

An alternative embodiment of this invention may incorporate a remotely mounted external oil filter. That is to say that rather than mounting the filter canister directly in the wall of the pan, the filter is mounted on the frame of the vehicle, perhaps within the engine compartment of the vehicle. In this embodiment (not pictured), the filter canister is attached to a cooperating mounting adapter having lubricant inlet and outlet ports. The mounting adapter ports in turn are connected via conventional hydraulic fluid hoses to cooperating ports formed into the wall of the pan. In this manner, potentially contaminated fluid is delivered to the remotely mounted filter and cleansed fluid is returned to the inlet of the transmission pump. This embodiment enjoys the benefits of a more easily accessible filter canister but suffers the disadvantage of lengthy connecting hoses and associated line pressure losses.

Although this invention has been described above with reference to particular means, materials and embodiments, it is to be understood that the invention is not limited to these disclosed particulars, but extends instead to all equivalents within the scope of the following claims.

I claim:

1. An external lubricant filter system for automatic transmissions having a lubricant pump, said system comprising:

a modified transmission lubricant pan assembly including a peripheral side wall defining an upper open end adapted for attachment to an automatic transmission, a bottom wall closing the bottom of said peripheral side wall, and a filter adapter fixedly secured within the peripheral side wall, said peripheral side wall and said bottom wall and said adapter together defining an internal surface facing an interior space of said pan and an external surface facing opposite said internal surface, said adapter further including an externally threaded pipe nipple extending from the external surface thereof, a lubricant entry port extending through said adapter, a plenum extending into the external surface of said adapter, and a filter canister sealing surface on the external surface of said adapter and surrounding said plenum, a plurality of generally flat walls attached to the internal surface of the pan, said plurality of generally flat walls being configured and arranged to define an inlet chamber and an outlet chamber adjacent the internal surface of said pan, wherein said lubricant entry port extends from said plenum to said inlet chamber, and wherein said threaded pipe nipple opens into said outlet chamber, and wherein an uppermost one of said generally flat walls defining the outlet chamber is positioned within said interior space and adjacent the open upper end of said pan, said uppermost one of said generally flat walls including an upwardly facing outlet port;

an external spin on-off lubricant filter canister removably connected to said externally threaded pipe nipple and sealing against said filter canister sealing surface; and a lubricant pick up assembly attached to one of said generally flat walls defining said inlet chamber for delivering lubricant from the interior space of said pan to said inlet chamber; and a lubricant discharge tube including lower and upper ends, the lower end being fixedly received within said upwardly facing outlet port, and the upper end being adapted for connection to said transmission pump.

2. The external lubricant filter system of claim 1, wherein said upwardly facing outlet port includes a seal, wherein the lower end of said lubricant discharge tube includes a lower shoulder that urges the seal against said upwardly facing outlet port, and wherein the upper end of said lubricant discharge tube includes an upper shoulder for urging a seal against an inlet port of the transmission lubricant pump.

3. The external lubricant filter system of claim 1, wherein the pick up assembly includes, a pick up tube, a downwardly facing cup portion attached to one end of the pick up tube positioned proximate the bottom wall of said pan for drawing lubricant from a bottom portion the interior space of said pan, and a flange portion attached to the other end of said pick up tube, the flange portion being fixedly attached to said one of the generally flat walls defining said inlet chamber.

* * * * *

UNITED STATES PATENT AND TRADEMARK OFFICE
CERTIFICATE OF CORRECTION

PATENT NO.    : 6,790,348 B2
DATED         : September 14, 2004
INVENTOR(S)   : Walter A. Osborn It is certified that error appears in the above-identified patent and that said Letters Patent is hereby corrected as shown below:

<u>Title page,</u>
Item [76], Inventor, "Walter A. Orborn" should read -- Walter A. Osborn --.

Signed and Sealed this

Sixteenth Day of August, 2005

JON W. DUDAS
*Director of the United States Patent and Trademark Office*